United States Patent [19]

Masse et al.

[11] Patent Number: 5,516,824
[45] Date of Patent: May 14, 1996

[54] SOLVENT-FREE LAMINATING ADHESIVE COMPOSITION

[75] Inventors: Michael A. Masse, Richmond; Paul A. Mancinelli, Woodlands; James R. Erickson, Katy; Steven H. Dillman, Houston; Robert C. Bening, Katy; David R. Hansen, Houston, all of Tex.

[73] Assignee: Shell Oil Company, Houston, Tex.

[21] Appl. No.: 337,714

[22] Filed: Jan. 23, 1995

Related U.S. Application Data

[62] Division of Ser. No. 43,428, Apr. 6, 1993, Pat. No. 5,393,818.

[51] Int. Cl.$^6$ .............................. C08K 5/10; C08L 63/08
[52] U.S. Cl. .............. 524/270; 525/93; 525/98; 525/99; 524/534
[58] Field of Search ..................... 523/436, 438; 524/270, 271, 391, 396, 404; 525/93, 97, 98, 99

[56] References Cited

U.S. PATENT DOCUMENTS

| | | |
|---|---|---|
| 4,237,245 | 12/1980 | Halasa et al. . |
| 5,149,895 | 9/1992 | Coolbaugh et al. . |
| 5,210,359 | 5/1993 | Coolbaugh et al. . |

FOREIGN PATENT DOCUMENTS

| | | |
|---|---|---|
| 0396780A1 | 11/1990 | European Pat. Off. . |
| 0441485A2 | 8/1991 | European Pat. Off. . |

Primary Examiner—Joseph L. Schofer
Assistant Examiner—Wu C. Cheng
Attorney, Agent, or Firm—Donald F. Haas

[57] ABSTRACT

A laminating adhesive comprising an adhesive composition which comprises (a) An epoxidized block copolymer of the formula $$(A\text{-}B\text{-}A_p)_n\text{-}Y_r\text{-}(A_q\text{-}B)_m$$

wherein Y is a coupling agent or coupling monomers, and wherein A and B are polymer blocks which may be homopolymer blocks of conjugated diolefin monomers, copolymer blocks of conjugated diolefin monomers or copolymer blocks of conjugated diolefin monomers and monoalkenyl aromatic hydrocarbon monomers, and wherein the A blocks have a higher number of aliphatic double bonds between a tertiary carbon atom and either a primary, secondary, or tertiary carbon atom per unit of block mass than do the B blocks, and wherein the A blocks have a molecular weight from about 100 to about 3000 and the B blocks have a molecular weight from about 1000 to about 15,000, and wherein p and q are 0 or 1 and n>0, r is 0 or 1, m≧0 and n+m ranges from 1 to 100; and (b) at least a significant amount of a tackifying resin compatible with the polymer of (a) up to 400 phr.

The invention also relates to a laminate containing the adhesive.

2 Claims, No Drawings

SOLVENT-FREE LAMINATING ADHESIVE COMPOSITION

This is a division, of application Ser. No. 08/043,428, filed Apr. 6, 1993, now U.S. Pat. No. 5,393,818.

BACKGROUND OF THE INVENTION

This invention relates to a method for laminating two substrates together which does not require the use of a solvent. More particularly, this invention relates to a solvent-free laminating adhesive composition for use in flexible packaging lamination. Most particularly, the invention relates to the use of novel, solvent-free adhesive systems utilizing lightly epoxidized low molecular weight block copolymers of conjugated dienes.

Many adhesive compositions have been suggested in the art for bonding materials such as rubber, wood, plastic, paper, fabric and the like to each other or other materials. Various types of polymers have been suggested for use in adhesive recipes to accomplish these goals and certain polymers, such as block copolymers of conjugated dienes and vinyl aromatic hydrocarbons have proved very useful in adhesive applications, imparting very good adhesive and elastomeric properties to adhesives made with the polymers.

There has, however, been a problem in making laminating adhesives which are used to bond two substrates together, especially in flexible packaging applications. While the above polymers can be used to make laminating adhesives, they suffer from the property of having prohibitively high melt viscosities. Thus, the energy that would be required would be excessive for melt application of these adhesives. Further, the temperatures required to achieve the melt state in the above mentioned polymers are too high for many polymeric substrates used to construct laminates. As such, the above mentioned polymers are useful as laminating adhesives only when carried by a solvent. In addition, wholly hydrocarbon polymers do not possess polar chemical functionality which can enhance adhesion to polar substrates. The invention in U.S. Pat. No. 4,135,037 attempted to add polar functionality by extensively epoxidizing these polymers of conjugated dienes and vinyl aromatic hydrocarbons and then using them in adhesive compositions requiring rosin based tackifying resins. Better results were shown with these epoxidized polymers than with the unepoxidized precursor polymers. However, these relatively high molecular weight epoxidized polymers had to be applied at 203° C. or required the use of large amounts of solvent in order to lower the viscosity of the polymer sufficiently so that it could be used in the adhesive application.

Thus, it can be seen that there is a need for a low viscosity adhesive which gives sufficient adhesion characteristics and which is capable of being used in the absence of a solvent to make it more useful in laminating adhesive applications. One of the criterion in this application is that the adhesive layer be very thin, especially when it is used in a flexible packaging construction. This is different from most pressure sensitive adhesive applications which can use relatively thick layers of the adhesive. The present invention provides such a laminating adhesive.

SUMMARY OF THE INVENTION

The present invention relates to a laminating adhesive which comprises a crosslinked adhesive composition which is comprised of:

(a) An epoxidized block copolymer of the formula $$(A\text{-}B\text{-}A_p)_n\text{-}Y_r\text{-}(A_q\text{-}B)_m$$

wherein Y is a coupling agent or coupling monomers, and wherein A and B are polymer blocks which may be homopolymer blocks of conjugated diolefin monomers, copolymer blocks of conjugated diolefin monomers or copolymer blocks of conjugated diolefin monomers and monoalkenyl aromatic hydrocarbon monomers, and wherein the A blocks have a higher number of aliphatic double bonds between a tertiary carbon atom and either a primary, secondary or tertiary carbon atom (TU site) per unit of block mass than do the B blocks, and wherein the A blocks have a molecular weight from about 100 to about 3000 and the B blocks have a molecular weight from about 1000 to about 15,000, and wherein p and q are 0 or 1 and n>0, r is 0 or 1, m≧0 and n+m ranges from 1 to 100;

(b) From a significant amount up to 400 phr (parts per hundred rubber—rubber refers to the polymer) of a tackifying resin which is compatible with the block copolymer; and (c) optionally, a crosslinking agent. The block copolymer preferably contains from 0.1 to 3 Meq/g of epoxy groups per gram of polymer. Also, the polymer may be hydrogenated but different tackifying resins are required when the polymer is hydrogenated because of the compatibility requirement. The crosslinking may be carried out by chemical crosslinking wherein the crosslinking agent is required, or it may be carried out by radiation crosslinking, wherein the crosslinking agent may be omitted.

The invention also relates to a process for producing a laminating adhesive. This process comprises combining the above polymer with the indicated amount of tackifying resin and then crosslinking the combination. The invention also relates to a process for lamination which comprises applying to a first substrate the adhesive composition described above and then affixing a second substrate to the first substrate by applying the second substrate over the adhesive composition.

DETAILED DESCRIPTION OF THE INVENTION

Polymers containing ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk or solution techniques. In any case, the polymer of this invention containing at least ethylenic unsaturation will, generally, be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include monomers which do and monomers which do not form a polymer with TU sites. Examples of monomers that do provide TU sites after polymerization include isoprene (2-methyl-1,3-butadiene), 2-ethyl-,1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene(myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Other monomers that provide TU sites include di-substituted conjugated diolefins which include 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene, 2,3-dimethyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-fluoro-1,3-octadiene and the like. Those that do not form polymers which have TU sites include 1,3-butadiene, piperylene, 4,5-diethyl-1,3-octadiene and the like. Alkenyl aromatic hydrocarbons which may be copolymerized include vinyl aryl compounds such as styrene, various alkyl-substituted styrenes, alkoxysubstituted styrenes, vinyl napthalene, alkyl-substituted vinyl napthalenes and the like.

In general, any of the solvents known in the prior art to be useful in the preparation of such polymers may be used. Suitable solvents then, include straight—and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like. More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

As stated above, the molecular weight of the A blocks varies from about 100 to about 3,000 because this molecular weight provides an adequate number of carbon to carbon double bonds (TU sites) that resist hydrogenation and/or allow easier functionalization, such as epoxidation, and subsequent crosslinking. A single molecule may possess a number of different sized A blocks with molecular weights in the range herein specified. The molecular weights of the B blocks range from about 1,000 to about 15,000 to provide flexible, short polymeric chains that limit the viscosity and especially the elasticity of the final uncured polymer. The B blocks are relatively easy to hydrogenate and more difficult to functionalize, such as by epoxidation, and, hence, they tend to remain more flexible than the A blocks after crosslinking. Preferred versions of the block polymers of the present invention have A block molecular weights between about 300 and about 2,000, most preferably between about 600 and about 1,200, because the tighter ranges tend to provide the best balance of crosslinking site availability and viscosity control. The preferred B block molecular weights are between about 2,000 and about 10,000, most preferably between about 3,000 and 7,000, to minimize the polymer viscosity. In most cases, polymers which fall within the preferred molecular weight ranges are viscous liquids at room or slightly elevated temperatures as compared to most commercial conjugated diene-monoalkenyl aromatic hydrocarbon block copolymers or the copolymers of U.S. Pat. No. 3,607,982, which are relatively high molecular weight viscoelastic solids.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are to be measured. For anionically polymerized diblock polymers, diblock polymer is essentially monodisperse (the ratio of the weight average molecular weight to the number average molecular weight is close to 1.0) and it is both convenient and adequately descriptive to report the "peak" molecular weight of the narrow molecular weight distribution observed. This peak is virtually identical to the weight average molecular weight. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y., 1972.
3. W. Kaye and A. J. Havlik, *Applied Optics*, 12, 541 (1973).
4. M. L. McConnell, *American Laboratory.* 63, May, 1978.

Referring to the formula set forth in the Summary of the Invention section, especially useful epoxidized polymers within the scope of the present invention are those that have a value of n greater than about 4 and especially preferred polymers are those with a value of n greater than about 10. These polymers can be made especially reactive even when using low levels of epoxidation, such as 0.1 to 3.0, preferably 0.5 to 2.0, Meq epoxy/g, (polymers with epoxide equivalent weights of between about 10,000 and 333), because the number of epoxidized crosslinkable sites per polymer molecule is still relatively high. Also especially useful are polymers where the number of TU sites per unit of block mass on the A blocks exceeds that on the B blocks by a ratio of at least about 3:1, more preferably at least about 8:1, and most preferably by at least about 20:1, because this allows the polymer to be crosslinked in local regions with relatively uncrosslinked regions spaced in between. This allows the polymer to maintain flexibility even after crosslinking.

Diblock, linear, radial and symmetric and asymmetric star copolymers are encompassed by the $(A-B-A_p)_n-Y_r-(A_q-B)_m$ nomenclature. The following are illustrative examples.

$(A-B)_1$ is a diblock polymer consisting of an A block and a B block and Y is absent. $(A-B)_1YB_1$ is a diblock polymer consisting of an A block and double B block, where the two B blocks are separated only by a difunctional coupling agent Y. $(A-B)_2Y$ is a linear A-B-Y-B-A polymer that was made by coupling and a $(A-B)_2$ is a linear A-B-B-A polymer that was made by sequentially adding A, B, B, A block monomers. Y is absent. $(A-B)_4Y$ is a symmetrical radial block copolymer where Y would usually be a tetrafunctional coupling agent. $(A-B)_2YB_2$ is an asymmetrical radial block copolymer. $(A-B)_{20}Y_r$ is a symmetrical star block copolymer and $Y_r$ would be a small number of multifunctional coupling monomer monomers such as those obtained when the coupling monomer is divinylbenzene (DVB). $(A-B)_5Y_r(B-A')_{13}$ is an asymmetric star block copolymer having A and A' blocks of identical composition but different molecular weight. $(A-B)_3Y_rB_{17}$ is an asymmetrical star block copolymer. It can be conveniently made by initiating and polymerizing the A blocks and then adding more alkyl lithium to the reactor prior to adding the B-type monomers or by synthesizing (A-B) and B in separate vessels. Living A-B diblocks and B blocks will result that can be coupled with the appropriate agent, such as DVB. A statistical distribution of species will be made by this process, having the average $(A-B)_3YB_{17}$ composition. $(A-B)_{20}Y(A-B)_{20}$ is an asymmetrical star block copolymer prepared by coupling 20 A-B diblocks with a small number of coupling monomers, such as DVB monomer, and then adding A-type monomers followed by B-type monomers before quenching the living system with a proton source.

There are a wide variety of coupling agents that can be employed. Any polyfunctional coupling agent which contains at least two reactive sites can be employed. Examples of the types of compounds which can be used include the poleypoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 154,096,203 and 3,594,452 which are herein incorporated by reference. When the coupling agent has two reactive sites such as dibromoethane, the poller will have a linear ABA structure. When the coupling agent has three or more reactive sites, such as silicon tetrachloride, the polymer will have blanched structure, such as $(A-B)_nY$. Coupling monomers are coupling agents where several monomer units are necessary for every chain end to be coupled. Divinylbenzene is the most commonly used coupling monomer and polymers.

Preparation of polymers which have controllable and predictable amounts of residual ethylenic unsaturation is disclosed in U.S. Pat. No. 4,879,349 which is herein incorporated by reference. The process disclosed therein includes copolymerizing substituted and unsubstituted conjugated diolefins and hydrogenating the copolymer under conditions which are effective to substantially hydrogenate the ethylenic unsaturation which is unsubstituted but leave the substituted ethylenic unsaturation substantially unhydrogenated. Partial hydrogenation utilizing the process described in this patent is preferred because of the excellent controllability of the amount of residual unsaturation. It is likely that better performance will be achieved when the catalyst disclosed in the patent is replaced by a titanium catalyst such as is disclosed in U.S. Pat. No. 5,039,735 entitled "Selective Hydrogenation of Conjugated Diolefin Polymers" which are incorporated herein by reference. Further, it is likely that better performance will be achieved if the polymerization process described in U.S. Pat. No. 5,039,735, utilizing termination of polymerization by hydrogen, is used herein.

When the polymers of the present invention are partially hydrogenated, they should be hydrogenated such that from about 0.1 to about 3 Meq/g of the aliphatic double bonds remain in the polymer because less than 0.1 does not give enough crosslinking and more than 3 gives too much crosslinking without cost benefit. If the unsaturated polymer or the partially hydrogenated polymer is to be epoxidized, then it is preferred that 0.1 to about 3 Meq/g of double bonds be consumed providing 0.1 to 3 Meq/g of epoxy functionality. It is preferred that the extent of the epoxidation be from about 0.1 Meq/g to about 3.0 Meq/g, most preferably 0.5 to 2.0.

Some of the advantages of relatively low levels of epoxidation are:

the manufacturing cost is lower because less epoxidizing agent is used;

can maintain the polymer as an elastic material—because the crosslinking will not be dense;

the polymer will be relatively hydrophobic so water will be less of a problem; and the polymer can be formulated in conventional equipment.

When both hydrogenation and epoxidation are used, the best reactive polymers are those in which the amount of aliphatic double bonds has been reduced to about 0.5 Meq/g or less, preferably 0.2 Meq/g or less. This provides polymers that have better ultraviolet, ozone, weather and long term heat aging resistance. The preferred method of making hydrogenated epoxidized polymers is to partially hydrogenate the polymer first and then follow with as complete as possible epoxidation of the residual double bonds as discussed in the following paragraph. However, the process may be carried out by epoxidizing the polymer and then hydrogenating it or hydrogenation may be omitted altogether.

Partial hydrogenation is diene selective. Generally, the rate of hydrogenation is much greater for carbon-carbon double bonds in which neither of the carbons is tertiary than for carbon-carbon double bonds in which one of the carbons is a tertiary carbon (the TU sites). The rate of epoxidation of carbon-carbon double bonds is just the opposite. Tertiary carbons promote epoxidation with peroxyacids better than secondary carbons, which in turn are better than primary carbons. Especially useful for selective epoxidation are TU sites at cis-trisubstituted aliphatic double bonds, such as from cis-1,4-isoprene. Thus, polymers of the present invention are especially suitable for the processes of partial hydrogenation or epoxidation and are especially suitable for the sequential use of both processes on the polymer. Use of partial hydrogenation alone on the present polymers preferentially leaves a greater number per unit of weight of residual diene double bonds in the A blocks of the polymers, while use of epoxidation alone produces a greater number of epoxidized diene monomers per unit of block weight in the A blocks than the B blocks. Hydrogenation can be carried out either before or after epoxidation. As will be seen in the examples, both unsaturated and saturated epoxidized diene block polymers are useful for laminating adhesives.

Epoxidation of the base polymer can be effected by generally known methods such as by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylene chloride and the like and epoxidation conducted in this new solution or can be epoxidized neat. Epoxidation temperatures on the order of about 0° to 130° C. and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $O_2$ in the presence of tetra cyanoethylene. A temperature of about 150° C. and an oxygen partial pressure of about 58 atmospheres is suitable for this reaction.

The polymers of this invention may be cured (crosslinked) by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used.

The most common sources of alpha, beta and gamma radiation are radioactive nuclei. An ionizing radiation source with commercial polymer crosslinking applications is gamma radiation that is produced from either cobalt-60 or cesium-137 radioactive nuclei. X-rays can be produced through deceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e., maximum penetration per unit density of material, and is well suited for on-line, high speed processing applications. Commercially available high or low energy-electron-processing equipment are the Dynamitron® device, dynacote, insulating-core transformer, linear accelerator, Van de Graaff accelerator, pelletton, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps, and visible lasers may also be utilized.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another ether crosslink with another epoxy oxygen, or terminate by recapturing an electron.

The presence of water in the polymeric composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of about 0.1 Mrads to about 10 Mrads/s are acceptable and from about 0.1 Mrads to about 5 Mrads are preferred because of equipment cost and possible damage to substrate material.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydrophenyl sulfonium salts. The anions in these salts generally possess low nucleophilic character and include $SbF_6^-$, $BF_4P$-P, $PF_6^-$, and $AsF_6^-$. Specific examples include (4-octyloxyphenyl)-phenyl-iodonium hexafluoroantimonate, UVI-6990 (from Union Carbide), and FX-512 (3M Company). Bis(dodecyl phenyl)iodonium hexafluoroantimonate (UV9310C—GE) and UVI-6974—Union Carbide are especially effective. The onium salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other diene-based polymers. Examples of epoxides include bis(2,3-epoxy cyclopentyl)-ether, 3,4-epoxy cyclohexyl methyl-3,4-epoxy cyclohexone carboxylate, vinyl cyclohexene dioxide, limonene dioxide, epoxidized soya, tall, vernonia and linseed oils and fatty acids.

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids and acid anhydrides and in general by the curing methods described in U.S. Pat. No. 3,970,608, which is incorporated by reference. These materials are crosslinking agents. When the crosslinking agent is cationic, the concentration of this agent which should be used ranges from 1 to 20 phr because below 1 phr, crosslinking can be slow or incomplete and above 20 phr, the crosslinking can be too fast thereby causing excessive heat evolution and shortened pot life.

The adhesives used herein are capable of being used in laminating applications without a solvent. They are low viscosity as a result of their relatively low molecular weight—the arms of the polymers, whether they be linear, radial or star in configuration, are all relatively low in molecular weight. This produces a low viscosity polymer, in some cases a liquid polymer. This low viscosity, preferably no greater than 5000 Pa.s at 25° C. and 500 Pa.s at 50° C., is important so that the adhesive may be applied as a liquid at room temperature or slightly elevated temperatures without using diluting, non-reactive solvents.

The adhesive compositions of the present invention are particularly suitable for use in flexible packaging applications. They adhere well to almost any substrate, including polyolefins (particularly, corona discharge-treated polyolefins), polyesters, polyketones, metallic substrates, etc.

In the present adhesive application, it is advantageous to add an adhesion promoting or tackifying resin that is compatible with the polymer. Different tackifying resins are compatible with the unhydrogenated and hydrogenated versions of these epoxidized polymers. This is because the hydrogenated polymers have similar compatibility characteristics to saturated polyolefins.

A common tackifying resin is a diene-olefin copolymer of piperylene and 2-methyl-2-butene having a softening point of about 95° C. This resin is available commercially under the tradename Wingtack® 95 (Goodyear Chemical Company) and is prepared by the cationic polymerization of 60% piperylene, 10% isoprene, 5% cyclopentadiene,15% 2-methyl-2-butene and about 10% dimer, as taught in U.S. Pat. No. 3,577,398. This tackifying resin is most compatible with polymers being primarily composed of polyisoprene blocks or repeat units.

Other common tackifying resins are based on glycerin rosin esters. One example of such a resin is Foral® 85 made by Hercules. This resin has a softening point of 85° C. This tackifying resin is most compatible with polymers being primarily composed of polybutadiene blocks or repeat units.

Other adhesion promoting resins which are also useful in the compositions of this invention include hydrogenated rosins (typically compatible with hydrogenated polymers), esters of rosins (typically compatible with unsaturated polymers), polyterpenes (compatibility depends upon compositional details and method of formulation), terpenephenol resins (compatibility depends upon compositional details and method formulation), and polymerized mixed olefins (compatibility depends upon compositional details and method of formulation), lower softening point resins (compatibility depends upon compositional details and method of formulation) and liquid resins (compatibility depends upon compositional details and method of formulation). An example of a liquid resin is Adtac® LV resin from Hercules. To obtain good compatibility with saturated polymers and thermo-oxidative and color stability, it is preferred that the tackifying resin be a saturated resin, e.g., a hydrogenated dicyclopentadiene resin such as Escorez® 5000 series resin made by Exxon (typically compatible with hydrogenated polymers) or a hydrogenated polystyrene or polyalphamethyl styrene resin such as Regalrez® resin made by Hercules (typically compatible with hydrogenated polymers). The amount of adhesion promoting resin employed varies from a significant amount, preferably at least 10, to about 400 parts by weight per hundred parts rubber (phr), preferably between about 20 to about 350 phr because the balance of tack and strength is most favorable in this range. The selection of the particular tackifying agent is, in large part, dependent upon the specific polymer employed in the respective adhesive composition.

The adhesive composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Combinations of primary and secondary antioxidants may be used. Such combinations include sterically hindered phenolics with phosphites or thioethers, such as hydroxyphenylpropionates with aryl phosphates or thio ethers, or amino phenols with aryl phosphates. Specific examples of useful antioxidant combinations include 3-(3,5-di-t-butyl-4-hydroxy-phenyl)propionate)methane (Irganox® 1010 from Ciba-Geigy) with tris(nonyl-phenyl)phosphite (Polygard® HR from Uniroyal), Irganox® 1010 with bis(2,4-di-t-t-butyl)pentaerythritol disphosphite (Ultranox® 626 from Borg-Warner). Antioxidants that act as bases generally should be avoided.

Additional stabilizers known in the art may also be incorporated into the adhesive composition. These may be for protection during the life of the article against, for example, oxygen, ozone and ultra-violet radiation. However, these additional stabilizers should be compatible with the essential stabilizers mentioned hereinabove and their intended function as taught herein.

Further, all components or additives must be compatible with the chemistry involved in the crosslinking reaction. Particular attention must be paid to avoid incorporation of components or additives which inhibit polymer crosslinking. Various methods to prepare adhesive formulations are known to the art and any method that produces a homogeneous blend is satisfactory. The resultant adhesives may then preferably be used in a wide variety of product assembly applications. For example, the adhesive formulation may be created by blending the components at elevated or room temperature. For demonstration purposes, the components may also be codissolved in a common solvent.

As stated above, these polymers are used in the claimed laminating adhesives. Such adhesives are somewhat like coatings in that flexible, thin layers are required. They are used in a very thin layer, perhaps 0.1 mils as opposed to 1.5 mils for other pressure sensitive adhesives. Since much less material is used to adhere the two substrates together than is used in pressure sensitive adhesives, the adhesive needs to be strong and have a very good adhesion character. That means it has to have good wetability (conforms to the substrate surface on a microscopic scale, i.e. flows across the surface). Also, a good attractive (adhesive) bond is necessary—this means there must be some affinity between the substrate and the adhesive molecules. It is theorized herein that the light epoxidation increases the adhesive bond because of the polar nature of the oxygen but the primary function of the epoxy groups herein is to provide a crosslinkable group so that the polymer can be crosslinked to increase the strength. Crosslinking builds a covalent network throughout the adhesive. Normal SBS or SIS polymers also have good strength but that strength is provided by physical association of the styrene domains and the strength is lost when the polymer is heated or contacted with solvent. The strength provided to the polymers in the present invention is permanent since it is derived from covalent crosslinking of the adhesive formulation.

Laminates may be formed by applying the adhesive to one substrate and then affixing a second substrate thereto by the application of moderate pressure and heat. Specific advantageous laminates which can be made include poly(vinyl idene chloride) coated poly(ethylene terephthalate) /adhesive/corona discharge treated polyethylene, poly(vinylidene chloride) coated poly(ethylene terephthalate)/adhesive/aluminum, polyolefin/adhesive/polyolefin, poly(ethylene terephthalate)/adhesive/polyolefin, polyketone/adhesive/poly)ethylene terephthalate), polyamide/adhesive/poly(ethylene terephthalate), other combinations or permutations of the same and also other like substrates.

The advantages of the adhesives of the present invention are that, as stated above, the adhesive bond is somewhat stronger than equivalent non-epoxidized or other functionalized polymers and the light epoxidation provides sufficient crosslinking for added strength but not too much crosslinking to cause the entire polymer to become embrittled and inflexible and therefore be unusable. Also, these adhesives are not susceptible to solvents because of the covalent crosslinking—physical crosslinking in SBS or SIS will dissolve. The adhesives of the present invention have sufficiently low viscosity such that they may be applied as 100% solids—no solvent is required. Other 100% solid content adhesives require the use of monomeric isocyanates which have toxicity problems and which also must be polymerized before they can be used in the adhesive. Because they are monomeric or oligomeric as applied to the laminate substrates, 100% isocyanate systems have little green strength. Thus, undesirable shear, or tunnelling, of the laminates may occur. The adhesives of the instant invention have molecular weights such that they impart some green strength to the laminate as it is first formed. The absence of a solvent such as water or organic solvent decreases the cost of the adhesive since water or solvent removal is not required. Further, reduced operating, health and environmental hazards are achieved with the absence of solvent.

EXAMPLES

The polymers used for laminating adhesives are listed in Table I. These polymers were formulated as specified further in these examples. Generally, there may be four components of the formulation: the epoxidized polymer; a tackifying resin; a crosslinking initiator or catalyst; and an antioxidant. The tackifying resins used were Foral® 85 which is a rosin ester resin from Hercules, Wingtack® 95 which is a $C_5$ hydrocarbon resin from Goodyear Chemical, and Escorez® 5380 which is a hydrogenated resin from Exxon Chemical.

The crosslinking initiating agent used was Leecure B1310 which is a $BF_3$ derivative from Leepoxy Plastics. This component is a chemical crosslinking agent with which the crosslinking reaction is initiated thermally. While these examples have been conducted using chemical crosslinking methods, other methods such as irradiation by electron beam or irradiation by ultraviolet light when a photoactive crosslinking agent is present are suitable for adhesive crosslinking.

Other polymers were used as comparative examples. They were: KRATON® D1102 rubber, a high molecular weight styrene-butadiene-styrene linear block copolymer from Shell Chemical; KRATON® D1107 rubber, a high molecular weight styrene-isoprene-styrene linear block copolymer from Shell Chemical; KRATON® D1320 rubber, a high molecular weight star block copolymer having styrene-isoprene arms and polyisoprene homopolymer arms from Shell Chemical; and KRATON® G1901 rubber, a high molecular weight linear hydrogenated styrene-ethylene/butylene-styrene block polymer containing 2% maleic anhydride grafted thereon from Shell Chemical.

TABLE I

Composition and Characterization of Four Experimental Epoxidized Polymers

| Polymer | A | B | C |
|---|---|---|---|
| Base Polymer Characteristics | | | |
| Block compositions: | | | |
| Block A | I | I | I |
| Block B | B | B | B |
| Arm mol. wt. | 5,800 | 5,800 | 4,700 |
| B/A mol. wt. ratio | 5/1 | 5/1 | 5/1 |
| MW | 97,000 | 97,000 | 94,000 |
| n, avg. no. arms | 17 | 17 | 20 |
| Coupling efficiency, % | 84 | 84 | 89 |
| Post Hydrogenation + Epoxidation | | | |
| Hydrogenated | No | Yes | No |
| Epoxidized | Yes | Yes | No |
| Epoxy equivalent wt. | 590 | 740 | — |
| A/B epoxy concentration ratio | 3/2 | 12/1 | — |
| Avg. no. epoxide groups per molecule | 210 | 150 | — |
| B block Tg, °C. | −60 | −60 | −60 |

I: Polyisoprene
B: Polybutadiene

The adhesive was prepared by dissolving the formulation components in toluene. While an important object of the present invention is to make an adhesive polymer capable of being applied with no solvent, these examples are demonstrated using formulations prepared and applied in solvent. In the absence of relatively sophisticated processing equipment, the approach of solution formulating allows good mixing of adhesive ingredients. Further, in the absence of relatively sophisticated processing equipment, the approach of solution formulating allows precise control over the thickness of the applied adhesive layer. That the polymers of the present invention allow solvent free processing is demonstrated by their neat viscosities. Table II lists the viscosities of the polymers. These viscosities were measured using a rheometrics mechanical spectrometer. The polymer is held between parallel plates at a controlled temperature. A dynamic strain is placed upon the polymer by circumferentially directed oscillation of one plate. The magnitude of the strain is such that the polymer behaves in a linearly viscoelastic fashion. The viscosities measured are commonly referred to as complex viscosities.

As can be seen from Table II the polymers of the present invention have viscosities several orders of magnitude below the conventional commercial polymers. The conventional polymers can only be melt processed at temperatures much greater than 100° C. Thus, the polymers of the present invention are vastly improved for application as melts in the temperature range of 25° to 75° C. which is highly desirable in many laminating applications.

With the formulation prepared in solvent a thin film was then cast upon a substrate. The substrates used to illustrate the present invention were poly(vinylidene chloride) coated poly(ethylene terephthalate) (C-PET), corona discharge treated polyethylene (T-PE) and polyketone (PK). The thickness of the applied solution was determined by use of a doctor blade having a precision machined tolerance. The thickness of the final dried adhesive layer was determined by the solution concentration given a particular doctor blade tolerance. The cast formulations were air dried for one hour. The laminate was then prepared by placing the second substrate in contact with the adhesive surface and rolling smooth with a 2 lb. roller. The laminate was next heat pressed at 50° C. for variable lengths of time.

TABLE II

Dynamic Viscosities of Experimental Epoxidized Polymers and Commercial Thermoplastic Elastomers $\eta^*$ (Pascal-Second) at 10 Radians/Second

| Polymer | 30° C. | 50° C. | 70° C. | 90° C. |
|---|---|---|---|---|
| A | 600 | 130 | 50 | 20 |
| B | 1,500 | 230 | 90 | 25 |
| D1107 | 64,000 | 61,000 | 58,000 | 54,000 |
| D1102 | 680,000 | 590,000 | 380,000 | 200,000 |
| D1320[1] | >830,000 | >830,000 | >830,000 | >830,000 |
| G1652[2] | >33,000 | >33,000 | >33,000 | ~33,000 |
| FG1901[3] | >30,000 | >30,000 | >30,000 | >30,000 |

[1]This viscosity was measured at 99° C. At lower temperatures the polymer becomes a rubbery solid and its viscosity is immeasurable using this technique.
[2]This viscosity was measured at 90° C. and 6.28 rad/sec. At lower temperatures the polymer becomes a rubbery solid and its viscosity becomes immeasurable by this technique.
[3]This viscosity was measured at 138° C. At lower temperatures the polymer becomes a rubbery solid and its viscosity becomes immeasurable by this technique.

The T-peel property which is used hereafter is a measurement of the strength of the adhesive bond on the laminating adhesive. The test is performed by gripping the two bonded substrates of the laminate and then measuring the force required to peel the substrates apart at a specified rate. The geometry of the test is such that the angle between the gripped substrates is 180° C. The test can be performed on a standard tensile testing apparatus such as that manufactured by Instron. The cross head displacement speed which determines the rate of peel was 10 inches/minute. The laminates for this test were prepared as previously described. They were cut into strips one inch in width and several inches in length for testing. The value of T-peel strength here reported represents the average peeling force required over the several inch length of the test specimen.

EXAMPLE I

Experimental Polymer A was applied to substrate C-PET. The upper substrate was T-PE. The crosslinking agent level was 10 phr. The nominal adhesive layer thickness and the heat treatment time were varied. The T-peel results are shown in Table III. This data shows that the heat treatments of 60 seconds are effective for adhesive bond formation. The data further shows that good initial strengths are achieved with thicknesses of 0.2 mils.

TABLE III

| nominal adhesive layer thickness | time at heat treatment temperature | T-peel/mode of failure (g/linear inch)/ (A for adhesive, C for cohesive) | |
|---|---|---|---|
| (mils) | (sec) | 0 hrs | 264 hrs |
| 0.1 | 0 | 21/C | 37/A |
| 0.1 | 5 | 21/C | 28/A |
| 0.1 | 10 | 27/C | 41/A |
| 0.1 | 60 | 45/C | 25/A |

TABLE III-continued

| nominal adhesive layer thickness (mils) | time at heat treatment temperature (sec) | T-peel/mode of failure (g/linear inch)/ (A for adhesive, C for cohesive) | |
|---|---|---|---|
| | | 0 hrs | 264 hrs |
| 0.2 | 0 | 50/C | 21/A |
| 0.2 | 5 | 57/C | 21/A |
| 0.2 | 10 | 62/C | 21/A |
| 0.2 | 60 | 79/C | 26/A |
| 0.5 | 0 | 137/C | 31/A |
| 0.5 | 5 | 144/C | 21/A |
| 0.5 | 10 | 152/C | 19/A |
| 0.5 | 60 | 192/C | 25/A |

EXAMPLE II

Polymer B was applied to substrate C-PET. The upper substrate was T-PE. The crosslinking agent level was 10 phr. The nominal adhesive layer thickness and the heat treatment time were varied. The T-peel results are shown in Table IV. This data shows the same effects as Example I. In this example the adhesive polymer is saturated.

TABLE IV

| nominal adhesive layer thickness (mils) | time at heat treatment temperature (sec) | T-peel/mode of failure (g/linear inch)/(A for adhesive, C for cohesive) | | | |
|---|---|---|---|---|---|
| | | 0 hrs | 24 hrs | 48 hrs | 72 hrs |
| 0.1 | 0 | 52/C | 58/A | 36/A | 31/A |
| 0.1 | 5 | 70/C | 107/C | 79/C | 69/A |
| 0.1 | 10 | 63/C | 95/A | 91/A | 82/A |
| 0.1 | 60 | 95/C | 120/C | 109/A | 90/A |
| 0.2 | 0 | 77/C | 122/C | 98/A | 103/A |
| 0.2 | 5 | 90/C | 145/C | 128/A | 116/A |
| 0.2 | 10 | 95/C | 183/C | 129/A | 112/A |
| 0.2 | 60 | 141/C | 176/C | 136/A | 131/A |
| 0.5 | 0 | 166/C | 276/C | 188/A | 160/A |
| 0.5 | 5 | 177/C | 285/C | 185/A | 164/A |
| 0.5 | 10 | 200/C | 281/C | 202/A | 167/A |
| 0.5 | 60 | 298/C | 204/A | 151/A | 112/A |

EXAMPLE III

Experimental Polymer B was applied to substrate C-PET. The upper substrate was T-PE. The nominal adhesive layer thickness was 0.2 mil. The laminate was heat pressed at 50° C. for 60 seconds. The crosslinking agent level was varied. The T-peel results are shown in Table V. This data demonstrates that approximately 10 phr of thermally initiated crosslinking catalyst is required for sufficient crosslinking to provide a strong bond.

TABLE V

| catalyst amount (phr) | T-peel/mode of failure (g/linear inch)/(A for adhesive, C for cohesive) | | | | |
|---|---|---|---|---|---|
| | 0 hrs | 24 hrs | 48 hrs | 72 hrs | 96 hrs |
| 1 | 34/C | 36/C | — | — | 24/C |
| 5 | 34/C | 70/C | — | — | 73/C |
| 10 | 141/C | 176/C | 136/A | 131/A | — |

EXAMPLE IV

Experimental Polymer A was applied to substrate C-PET. The upper substrate was T-PE. The nominal adhesive layer thickness was 0.2 mil. The laminate was heat pressed at 50° C. for 60 seconds. The crosslinking agent level was 10 phr. The type and amount of tackifying resin was varied. The T-peel results are shown in Table VI. This data shows that Foral® 85 tackifying resin improves the bond strength of adhesive based on experimental Polymer A. When Wingtack® 95 tackifying resin is used, a weaker bond results. Wingtack® 95 is known to be compatible with polyisoprene segments while Foral® 85 is known to be compatible with polybutadiene segments. Because Polymer A is primarily composed of polybutadiene segments Foral® 85 is most effective. Further, this data shows that the presence of tackifying resin is required to reach the more useful strength of 200 g/linear inch.

TABLE VI

| resin type | resin amount (phr) | T-peel/mode of failure (g/linear inch)/(A for adhesive, C for cohesive) | | | | | |
|---|---|---|---|---|---|---|---|
| | | 0 hrs | 24 hrs | 48 hrs | 96 hrs | 144 hrs | 264 hrs |
| none | 0 | 79/C | — | — | — | — | 26/A |
| Foral 85 | 50 | 38/C | 117/A | — | 75/A | — | — |
| Foral 85 | 100 | 90/C | 168/C | — | 146/A | — | — |
| Foral 85 | 200 | 486/C | 355/A | — | 301/A | — | — |
| Wingtack 95 | 50 | 14/C | 68/C | 55/A | — | 31/A | — |
| Wingtack 95 | 100 | 12/C | 33/C | 30/A | — | 18/A | — |
| Wingtack 95 | 200 | 11/A | 107/A | 31/A | — | 85/A | — |

EXAMPLE V

Conventional commercial polymers D1107 and D1102 were applied to substrate C-PET. The upper substrate was T-PE. The nominal adhesive layer thickness was 0.2 mil. The laminate was heat pressed at 50° C. for 60 seconds. The tackifying resin for D1107 was Wingtack® 95. The tackifying resin for D1102 was Foral® 85. The tackifying resin level and the crosslinking agent was varied. The T-peel results are shown in Table VII. This data shows that high molecular weight commercial polymers provide good bonds. However, as shown in Table II their exceedingly high viscosities prohibit melt processing at temperatures of 100° C. or less.

can be used in combination with T-PE and C-PET.

TABLE IX

| Substrate pair | T-Peel/mode of failure (g/linear inch)/(A for adhesive, C for Cohesive) | | |
|---|---|---|---|
| | 0 hrs | 24 hrs | 96 hrs |
| PK/PK | 47/C | 96/C | 89/C |
| PK/T-PE | 133/C | 192/C | 271/C |
| PK/C-PET | 103/C | 134/C | 164/C |

TABLE VII

| polymer | resin type | resin amount (phr) | cat amount (phr) | T-peel/mode of failure (g/linear inch)/(A for adhesive, C for cohesive) | | | | | | |
|---|---|---|---|---|---|---|---|---|---|---|
| | | | | 0 hrs | 24 hrs | 48 hrs | 72 hrs | 96 hrs | 120 hrs | 140 hrs |
| D1107 | none | 0 | 5 | 15/A | 31/A | 126/A | — | — | 24/A | — |
| D1107 | Wingtack 95 | 50 | 0 | 200/A | 278/A | — | 293/A | — | — | 270/A |
| D1107 | Wingtack 95 | 50 | 5 | 332/A | 336/A | 428/A | — | 310/A | — | — |
| D1102 | Foral 85 | 50 | 0 | 311/A | 267/A | — | 201/A | — | — | 336/A |
| D1102 | Foral 85 | 100 | 0 | 296/A | 404/A | — | 359/A | — | — | 452/A |
| D1102 | Foral 85 | 200 | 0 | 551/A | 648/A | — | 524/A | — | — | 452/A |
| D1102 | Foral 85 | 50 | 10 | 50/A | 78/A | 159/A | — | 139/A | — | — |
| D1102 | Foral 85 | 100 | 10 | 334/A | 324/A | 341/A | — | 276/A | — | — |
| D1102 | Foral 85 | 200 | 10 | 520/A | 385/A | 545/A | — | 483/A | — | — |

EXAMPLE VI

Conventional commercial Polymers D1320, G1652, and G1901 were applied to substrate C-PET. The upper substrate was T-PE. The nominal adhesive layer thickness was 0.2 mil. The laminate was heat pressed at 500° C. for 60 seconds. The tackifying resin for D1320 was Wingtack® 95. The tackifying resin for G1652 was Escorez® 5380. The tackifying resin level and the crosslinking agent level were varied. The T-peel results are shown in Table VIII. This data shows that high molecular weight commercial polymers provide good bonds. However, as shown in Table II their exceedingly high viscosities prohibit melt processing at temperatures of 100° C. or less.

EXAMPLE VIII

Nonepoxidized experimental Polymer C was applied to substrate C-PET. The upper substrate was T-PE. The nominal adhesive layer thickness was 0.2 mils. The laminate was heat pressed at 50° C. for 60 seconds. The tackifying resin was Foral® 85. The tackifying resin amount was varied. The T-peel results are shown in Table X. This data shows that block copolymers having both relatively short polyisoprene segments and polybutadiene segments are not effective for good bond formation.

TABLE VIII

| polymer | resin type | resin amt (phr) | cat. amt (phr) | T-peel/mode of failure (g/linear inch)/(A for adhesive, C for cohesive) | | | | |
|---|---|---|---|---|---|---|---|---|
| | | | | 0 hrs | 24 hrs | 48 hrs | 96 hrs | 120 hrs |
| D1320 | Wingtack 95 | 50 | 0 | 242/A | | | | |
| D1320 | Wingtack 95 | 100 | 0 | 428/A | | | | |
| D1320 | Wingtack 95 | 200 | 0 | 191/A | | | | |
| G1652 | Escorez 5380 | 0 | 5 | 118/A | 159/A | 159/A | — | 64/A |
| G1652 | Escorez 5380 | 50 | 0 | 38/A | 44/A | 44/A | 43/A | — |
| G1652 | Escorez 5380 | 50 | 5 | 98/A | 136/A | 114/A | 80/A | — |
| G1901 | none | 0 | 5 | 11/A | 5/A | — | — | 7/A |

EXAMPLE VII

Experimental Polymer A was applied to substrate PK. The upper substrate was PK, C-PET or T-PE. The crosslinking agent level was 10 phr. The nominal adhesive layer thickness was 0.2 mils. The laminates were heat pressed at 50° C. for 60 seconds. The T-peel results are shown in Table IX. These data show that polyketones are suitable substrates with the present invention. These data further show that PK

TABLE X

| Tackifying resin amount | T-peel/mode of failure (g/linear inch)/(A for adhesive, C for cohesive) | | | |
|---|---|---|---|---|
| (phr) | 0 hrs | 24 hrs | 72 hrs | 144 hrs |
| 0 | 8/C | 5/C | 4/C | 5/C |
| 100 | 28/C | 22/C | 19/C | 20/C |

We claim:

1. A laminating adhesive comprising a adhesive composition which comprises (a) an unhydrogenated epoxidized block copolymer which contains from 0.1 to 3.0 Meq epoxy per gram of polymer and has the formula

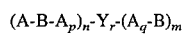

$(A\text{-}B\text{-}A_p)_n\text{-}Y_r\text{-}(A_q\text{-}B)_m$ wherein Y is a coupling agent or coupling monomers, and wherein A and B are polymer blocks of isoprene and butadiene, respectively, and wherein the A blocks have a higher number of aliphatic double bonds between a tertiary carbon atom and either a primary, secondary, or tertiary carbon atom per unit of block mass than do the B blocks, and wherein the A blocks have a molecular weight from about 100 to about 3000 and the B blocks have a molecular weight from about 1000 to about 15,000, and wherein p and q are 0 or 1 and n>0, r is 0 or 1, m≧0 and n+m ranges from 1 to 100;

(b) at least a significant amount of a tackifying resin compatible with the polymer of (a) up to 400 phr.

2. The adhesive of claim 1 wherein the polymer contains from 0.5 to 2 Meq of epoxy per gram of polymer.

* * * * *